US012213486B2

(12) United States Patent
Berthelot et al.

(10) Patent No.: US 12,213,486 B2
(45) Date of Patent: Feb. 4, 2025

(54) METHOD FOR PREPARING A BIOCIDAL, BACTERIOCIDAL AND/OR BACTERIOSTATIC MATERIAL

(71) Applicants: COMMISSARIAT À L'ÉNERGIE ATOMIQUE ET AUX ÉNERGIES ALTERNATIVES (CEA), Paris (FR); CONSERVATOIRE NATIONAL DES ARTS ET METIERS (CNAM), Paris (FR); CENTRE NATIONAL DE LA RECHERCHE SCIENTIFIQUE (CNRS), Paris (FR)

(72) Inventors: Thomas Berthelot, Les Ulis (FR); Céline Goulard-Huet, Le Mesnil-Saint-Denis (FR); Fanny Hauquier, Juvisy (FR)

(73) Assignees: COMMISSARIAT À L'ÉNERGIE ATOMIQUE ET AUX ÉNERGIES ALTERNATIVES (CEA), Paris (FR); CONSERVATOIRE NATIONAL DES ARTS ET METIERS (CNAM), Paris (FR); CENTRE NATIONAL DE LA RECHERCHE SCIENTIFIQUE (CNRS), Paris (FR)

( * ) Notice: Subject to any disclaimer, the term of this patent is extended or adjusted under 35 U.S.C. 154(b) by 842 days.

(21) Appl. No.: 17/415,368

(22) PCT Filed: Dec. 19, 2019

(86) PCT No.: PCT/FR2019/053185

§ 371 (c)(1),
(2) Date: Jun. 17, 2021

(87) PCT Pub. No.: WO2020/128350

PCT Pub. Date: Jun. 25, 2020

(65) Prior Publication Data

US 2022/0053766 A1 Feb. 24, 2022

(30) Foreign Application Priority Data

Dec. 19, 2018 (FR) ....................................... 1873328

(51) Int. Cl.

| | |
|---|---|
| ***A01N 59/20*** | (2006.01) |
| ***A01N 25/10*** | (2006.01) |
| ***A01N 25/34*** | (2006.01) |
| ***A01P 1/00*** | (2006.01) |

(52) U.S. Cl.

CPC ............. *A01N 59/20* (2013.01); *A01N 25/10* (2013.01); *A01N 25/34* (2013.01); *A01P 1/00* (2021.08)

(58) Field of Classification Search

CPC ......... A01N 43/90; A01N 25/10; A01N 33/12
See application file for complete search history.

(56) References Cited

U.S. PATENT DOCUMENTS

| | | | | |
|---|---|---|---|---|
| 2003/0027936 A1* | 2/2003 | Murray | .............. | G01N 21/7703 73/35.14 |
| 2012/0132845 A1* | 5/2012 | Lodefier | ................ | C08J 9/0066 252/62 |

FOREIGN PATENT DOCUMENTS

| | | | |
|---|---|---|---|
| CN | 103755928 A * | 4/2014 |
| WO | 97/47696 A1 | 12/1997 |
| WO | 2004/044040 A1 | 5/2004 |
| WO | 2018/069508 A1 | 4/2018 |
| WO | 2019/106459 A1 | 6/2019 |

OTHER PUBLICATIONS

Xu et al., Polymer Chemistry, 2015, 6, 2945-2954.*
International Search Report (with English translation) and Written Opinion (with Machine translation) issued on Mar. 11, 2020 in corresponding International Application No. PCT/FR2019/053185; 15 pages.
Jean Kerim Nzambe Ta Keki et al., "Synthesis and photobactericidal properties of a neutral porphyrin grafted onto lignocellulosic fibers", Materials Science and Engineering C, vol. 62, Jan. 12, 2016, pp. 61-67.

* cited by examiner

*Primary Examiner* — Kyle A Purdy
(74) *Attorney, Agent, or Firm* — Maier & Maier, PLLC

(57) ABSTRACT

A process for preparing a biocidal, bactericidal and/or bacteriostatic material including the preparation of a polymer precursor solution that has (a) at least one monomer A having a porphyrin group and at least one radical polymerizable function, (b) at least one radical polymerizable monomer B, a photoinitiator, and (c) at least one of the monomers chosen from a monomer C having a quaternary amine and a radical polymerizable function; and/or a monomer D having copper and a radical polymerizable function. Also, the material obtainable by the process and its uses.

1 Claim, No Drawings

METHOD FOR PREPARING A BIOCIDAL, BACTERIOCIDAL AND/OR BACTERIOSTATIC MATERIAL

FIELD

The present invention relates to the field of materials, preferably surfaces having biocidal, bactericidal and/or bacteriostatic properties. In particular, the present application relates to a process for preparing a biocidal, bactericidal and/or bacteriostatic material capable of delivering singlet oxygen as a biocidal, bactericidal agent and/or comprising a molecule exhibiting bacteriostatic activity.

BACKGROUND

Cellulosic supports such as textiles and fabrics represent an environment conducive to the growth of microorganisms (including bacteria, fungi and viruses).

In order to alleviate this proliferation, research has been carried out in order to confer on these supports a durable and permanent antibacterial activity over time. One of the most effective approaches is to incorporate biocidal compounds on the surface and/or within the cellulosic support.

Among the biocidal compounds, photosensitizers, in particular of the porphyrin type, have the particularity in the presence of visible light, to release singlet oxygen, a reactive species which damages or destroys cells and microorganisms. Advantageously, if the singlet oxygen has not reacted with a cell or microorganism, it returns to its ground state in a harmless manner. The incorporation of photosensitizers into the breast and/or the surface of a cellulosic support offers the possibility of obtaining surfaces having long-term photo-bactericidal properties and not producing a secondary toxic product for its environment. However, this requires chemically grafting, via a covalent bond, the photosensitizer on the support to avoid any phenomenon of release of the active compound.

To date, the preparation of photobactericidal materials comprising porphyrins as a bactericidal agent requires severe conditions (high temperature, use of carcinogenic, mutagenic and/or reprotoxic compounds). Furthermore, when the material support is composed of fibers, such as cellulose fibers or synthetic fibers, the grafting of porphyrins requires working on isolated fibers before their shaping, making the process complex.

Alternative methods have been developed to prepare these materials under milder conditions. For example, BERTHELOT et al. (WO2018/069508) have developed a process consisting in modifying a porphyrin so as to introduce an arylazide function capable of reacting with the surface of a support via an insertion reaction. UV irradiation of the modified support results in a material with antibacterial properties. However, the method of BERTHELOT et al. requires steps of pre-functionalization of the photosensitizer before its grafting on a support. Furthermore, the material does not exhibit biocidal activity in the dark, which limits the potential applications of this material.

The incorporation of a bacteriostatic and/or biocidal activity of the material when the latter is placed in the dark, involves using other grafting strategies on the support than those used for the immobilization of porphyrin.

None of the methods of the prior art allows a support to be modified in a single step, in order to provide a material having biocidal, bactericidal and/or bacteriostatic properties, these properties being active both in the dark and in the dark. in the presence of light.

Thus, there is still a need to provide a unique process for preparing a biocidal, bactericidal and/or bacteriostatic material which is active both in the dark and in the presence of light; the implementation of the process must be compatible with the constraints of industrialization, in particular by favoring implementation in milder conditions, and with a reduced number of steps, preferably in a single step.

Surprisingly, the Applicant has demonstrated that a material with such properties could be obtained from a process comprising the preparation and/or the use of a precursor solution comprising:

- a. at least one monomer A having a porphyrin group and at least one radical polymerizable function,
- b. at least one radical polymerizable monomer B,
- c. a photoinitiator, and
- d. at least one of the monomers chosen from:
  - i. a monomer C comprising a quaternary amine and a radical polymerizable function; and/or
  - ii. a monomer D comprising copper and a radical polymerizable function.

SUMMARY

The invention therefore relates to a process for preparing a biocidal, bactericidal and/or bacteriostatic material, said process comprising:

- a. the preparation of a polymer precursor solution comprising:
  - i. at least one monomer A having a porphyrin group and at least one radical polymerizable function,
  - ii. at least one radical polymerizable monomer B,
  - iii. a photoinitiator,
  - iv. at least one of the monomers chosen from:
    1. a monomer C comprising a quaternary amine and a radical polymerizable function; and/or
    2. a monomer D comprising copper and a radical polymerizable function;
- b. contacting the polymer precursor solution obtained in (a) with a support, resulting in the impregnation of said support with said polymer precursor solution; and
- c. implementing by UV irradiation of the polymerization of the polymer precursor solution impregnated in the support according to step (b), said UV irradiation being carried out at an absorption wavelength less than the wavelength maximum absorption $\lambda_{max}$ of monomer A;
- d. optionally, initiating monomer A by light irradiation.

According to one embodiment, the monomer A is a protoporphyrin, preferably the protoporphyrin dimethyl ester or the disodium salt of the protoporphyrin.

According to one embodiment, the monomer C is chosen from (meth)acrylates comprising a quaternary amine; preferably is (2-(acryloyloxy)ethyl) trimethylammonium chloride.

According to one embodiment, the monomer D is chosen from (meth)acrylates comprising copper or di(meth)acrylates comprising copper; preferably copper acrylate or copper dimethacrylate.

According to one embodiment, the photoinitiator has a maximum absorption wavelength ranging from 350 nm to 400 nm; preferably from 360 to 380 nm; more preferably around 365 nm.

According to one embodiment, the precursor polymer solution further comprises a solvent, preferably chosen from polar solvents, more preferably a water/ethanol mixture or dimethylsulfoxide (DMSO).

The present invention also relates to a precursor solution of a biocidal, bactericidal and/or bacteriostatic polymer, said solution comprising the mixture of:

a. at least one monomer A having a porphyrin group and at least one radical polymerizable function,
b. at least one radical polymerizable monomer B,
c. a photoinitiator,
d. at least one of the monomers chosen from:
  i. a monomer C comprising a quaternary amine and a radical polymerizable function; and/or
  ii. a monomer D comprising copper and a radical polymerizable function,
e. optionally, a solvent.

The present invention also relates to a biocidal, bactericidal and/or bacteriostatic material comprising a support impregnated with a polymer matrix resulting from the radical polymerization of a precursor polymer solution as described above.

The present invention also relates to the use of the precursor polymer solution as described above or of the biocidal, bactericidal and/or bacteriostatic material of the invention, for the preparation of protective clothing or coatings of protection.

According to one embodiment, the precursor polymer solution of the invention or the biocidal, bactericidal and/or bacteriostatic material of the invention is useful for the sterilization and/or decontamination of a surface.

In the present invention, the terms below are defined as follows:

"Acrylate": denotes a radical polymerizable function of formula $CH_2{=}CH(C{=}O)O^-$.

"Bactericidal": refers to any compound or material intended to kill bacteria.

"Bacteriostatic": refers to any compound or material able to inhibit the multiplication and/or the production of bacteria without killing them.

"Biocidal": refers to any compound or material used to kill, destroy, deteriorate, render harmless, prevent action or combat organisms; preferably unicellular organisms including for example eukaryotic or prokaryotic cells. In a preferred embodiment, the organisms are chosen from bacteria, fungi, viruses and/or yeasts.

"From X to Y": refers to the range of values between X and Y, the terminals X and Y being included in said range.

"More than X to Y": refers to the range of values between X and Y, terminal X being excluded and terminal Y being included in said range.

"About": placed in front of a digit or number means plus or minus 10% of the value of that digit or number.

"Radically polymerizable function": relates to any organic chemical function capable of being involved in a radical polymerization reaction, that is to say capable of providing, after activation, at least one active radical species capable of reacting with the radical polymerizable function of another monomer unit so as to form a single bond, preferably of carbon-carbon or carbon-oxygen type. According to one embodiment, the radical polymerizable function is chosen from acrylates, methacrylates, styrenics, vinyls, and acrylamides.

"UV irradiation": concerns any action of light having a wavelength in the ultraviolet range on a chemical compound or a material.

"Wavelength": represents the spatial periodicity of the oscillations of an electromagnetic wave, that is, the distance between two maximum oscillations of an electromagnetic wave. The wavelength is expressed in meters (m). According to the present invention, the term "absorption wavelength" refers to the wavelength of light after it has passed through a compound or material. According to the present invention, the expression "maximum absorption wavelength" denoted $\lambda_{max}$, denotes the wavelength for which the absorbance is maximum.

"Methacrylate": denotes a radical polymerizable function of formula $CH_2{=}CCH_3(C{=}O)O^-$.

"Monomer": relates, within the meaning of the present invention, to any organic compound having at least one radical polymerizable function, that is to say which is capable of being engaged in a radical polymerization reaction. According to one embodiment, the term "monomer" denotes any organic chemical compound comprising one or more functions chosen from acrylates, methacrylates, styrenics, vinyls, and acrylamides, preferably chosen from acrylates and methacrylates. According to one embodiment, the term "monomer" includes the macromolecular chains, preferably obtained by polymerization, comprising at least one function which can be polymerized by the radical route.

"Photoinitiator": concerns any compound capable, under the action of light, of initiating radical polymerization.

"Polymer": relates to a material comprising or consisting of one or more macromolecular chains. According to one embodiment, the term "polymer" denotes, in the present invention, the product of a radical polymerization. According to one embodiment, the term "polymer" denotes in the present invention the product of a polymerization carried out from monomers as defined above, that is to say from organic compounds having at least one radical polymerizable function including, for example, acrylates, methacrylates, styrenics, vinyls and acrylamides.

"Polymerization": relates to any organic reaction leading to the formation of one or more macromolecular chains, each comprising the repetition of a chemical unit. According to one embodiment, the term "polymerization" denotes a radical polymerization reaction characterized by an initiation step, a propagation step and a termination step, well known to those skilled in the art. According to one embodiment, the term "polymerization" denotes a radical polymerization reaction starting from monomers as defined above.

"Porphyrin": denotes any compound comprising a heterocyclic macrocycle consisting of four pyrrole subunits joined on their alpha carbons by four methine bridges. According to one embodiment, the term "porphyrin" also includes porphyrin derivatives, that is to say porphyrins substituted by one or more chemical functions, for example by linear or branched alkyls, alkenes, alkynes, heteroalkyls, carboxylic acids, esters, ketones, aldehydes, hydroxyls, amines and radical polymerizable functions as defined above. According to one embodiment, the term "porphyrin" includes protoporphyrins, their derivatives including protoporphyrins substituted by one or more chemical functions, and their salts such as, for example, the disodium salt of protoporphyrin. According to one embodiment, the term "porphyrin" includes the protoporphyrin dimethyl ester.

"Polymer precursor solution": relates to any liquid mixture leading, after polymerization, to obtaining a polymer as defined above.

"Polar solvent": relates to any solvent having a non-zero dipole moment.

DETAILED DESCRIPTION

Process

The present invention relates to a process for preparing a material, preferably a material having biocidal, bactericidal and/or bacteriostatic properties. According to one embodiment, the material of the invention has bactericidal and biocidal activity against bacterial spores and/or bacteriostatic activity. According to one embodiment, the material of the invention generates singlet oxygen as a bactericidal agent.

According to one embodiment, the material comprises or consists of a support and a coating.

According to one embodiment, the process of the invention is a process for polymerizing and/or grafting onto a support, a coating comprising or consisting of a polymer. According to one embodiment, the process of the invention is a process for polymerizing and/or impregnating on a support, a coating comprising or consisting of a polymer. According to one embodiment, the coating has biocidal activity against bacterial spores and/or bacteriostatic activity. According to one embodiment, the coating generates singlet oxygen as a bactericidal agent.

Step (a)

According to one embodiment, the method of the invention comprises at least one step of preparing a polymer precursor solution (also called "ink") (step denoted (a)).

According to one embodiment, the precursor polymer solution comprises or consists of the mixture of at least one monomer, preferably at least one monomer A having a porphyrin group and at least one function which can be polymerized by the radical route, with a photo-initiator. According to one embodiment, the polymer precursor solution comprises or consists of a mixture of at least one monomer A having a porphyrin group and at least one radical polymerizable function, at least one radical polymerizable monomer B, and a photo initiator.

According to one embodiment, the monomer A is a porphyrin or one of its derivatives. According to the present invention, the term "porphyrin derivative" means any substituted porphyrin, preferably any porphyrin substituted on at least one of its pyrrole rings and/or on at least one of its methine bridges. According to one embodiment, the monomer A is a porphyrin substituted with at least one group chosen from alkyl, heteroalkyl, alkene, aryl, heteroaryl, cycloalkyl and any radical polymerizable function such as, for example, acrylate, methacrylate, vinyl, or acrylamide; said group possibly being substituted by at least one substituent selected from alkyl, heteroalkyl, alkene, aryl, heteroaryl, cycloalkyl, carboxylic acid, hydroxyl, amine and ketone. According to one embodiment, the monomer A is a porphyrin substituted with at least one group chosen from alkyl, heteroalkyl, alkene, aryl, heteroaryl, cycloalkyl and any radical polymerizable function such as, for example, acrylate, methacrylate, styrene, vinyl, or acrylamide; said group possibly being substituted by at least one substituent selected from alkyl, heteroalkyl, alkene, aryl, heteroaryl, cycloalkyl, carboxylic acid, hydroxyl, amine and ketone.

According to one embodiment, the monomer A is a porphyrin substituted with at least one alkyl group, one alkene group and one alkyl group substituted with a carboxylic function.

According to one embodiment, the monomer A is a protoporphyrin or one of its salts and/or derivatives, preferably a protoporphyrin IX, more preferably the monomer A is the protoporphyrin dimethyl ester. In the present invention, the term "protoporphyrin salt" is understood to mean any protoporphyrin for which at least one of the protons of the carboxylic functions of the protoporphyrin has been replaced by an alkaline cation such as for example by a lithium ion, (Li+), sodium (Na+), potassium (K+), rubidium (Rb+), Cesium (Cs+) or Francium (Fr+). According to one embodiment, the monomer A is a salt of protoporphyrin, preferably the salt of disodium protoporphyrin.

According to one embodiment, the monomer B is chosen from any organic compound (including compounds of low molar masses and compounds of high molar masses such as macromolecular chains) having at least one radical polymerizable function, from preferably any organic compound having at least one function chosen from acrylates, methacrylates, styrenics, vinyls and acrylamides, preferably chosen from acrylates and methacrylates, more preferably said monomer B is 2-(dimethylamino) ethyl acrylate. According to one embodiment, the monomer B is a macromolecular chain having at least one radical polymerizable function; preferably, monomer B is a macromolecular chain obtained by any polymerization technique known to those skilled in the art, and comprising at least one radical polymerizable function; more preferably, said monomer B is a poly (ethylene glycol) chain comprising at least one acrylate or methacrylate function, more preferably said monomer B is poly(ethylene glycol) diacrylate (PEGDA).

In the present invention, the photoinitiator is chosen from those known to those skilled in the art. According to one embodiment, the photoinitiator is a radical photoinitiator, preferably chosen from phosphine oxides, acetophenone and its derivatives, benzoin ethers, benzophenone and its derivatives, thioxanthone and its derivatives, benzyl and its derivatives, more preferably the photoinitiator is diphenyl (2,4,6-trimethylbenzoyl) phosphine oxide.

According to one embodiment, the photoinitiator has a maximum absorption wavelength less than the maximum absorption wavelength of monomer A, preferably said photoinitiator has a wavelength absorption between 350 nm and 400 nm; preferably from 360 to 380 nm; more preferably around 365 nm.

According to one embodiment, the polymer precursor solution further comprises at least one compound having biocidal, bactericidal and/or bacteriostatic activity, partial or total, in the dark.

According to one embodiment, the compound having a biocidal, bactericidal and/or bacteriostatic activity, partial or total, in the dark is one of the monomers chosen from among:

a. a monomer C comprising a quaternary amine and a radical polymerizable function as defined above; and/or
b. a monomer D comprising copper and a radical polymerizable function as defined above.

According to one embodiment, the monomer C is chosen from (meth)acrylates comprising a quaternary amine, preferably is chosen from (acryloyloxyalkyl) alkylammonium, more preferably is (2-(acryloyloxy) ethyl) trimethylammonium. According to one embodiment, the monomer C comprises a halogenated counterion, preferably a chloride counterion.

According to one embodiment, the monomer D is chosen from (meth)acrylates comprising copper, preferably is a copper acrylate or a dimethacrylate comprising copper, more preferably is copper dimethacrylate (ie. a complex formed by a copper ion ($Cu^{2+}$) complexed with two methacrylate molecules.

According to one embodiment, the polymer precursor solution consists or comprises:

a. at least one monomer A having a porphyrin group and at least one radical polymerizable function,
b. at least one radical polymerizable monomer B,
c. a photoinitiator,
d. at least one of the monomers chosen from:

i. a monomer C comprising a quaternary amine and a radical polymerizable function; and/or ii. a monomer D comprising copper and a radical polymerizable function.

According to one embodiment, the polymer precursor solution comprises the monomer A in a range of more than 0% to 10%, preferably more than 0% to 9%, more than 0% to 8%, more than 0% to 7%, more than 0% to 6%, more than 0% to 5%, more than 0% to 4%, more than 0% to 3%, more than 0% at 2%, or more than 0% to 1%, by weight relative to the total weight of the polymer precursor solution. According to one embodiment, the polymer precursor solution comprises approximately 1%, 2%, 3%, 4%, 5%, 6%, 7%, 8%, 9% or 10% of monomer A, the percentages being expressed by weight relative to the total weight of the polymer precursor solution. According to one embodiment, the polymer precursor solution comprises approximately 0.1%, 0.2%, 0.3%, 0.4%, 0.5%, 0.6%, 0.7%, 0, 8%, 0.9% or 1% of monomer A, the percentages being expressed by weight relative to the total weight of the polymer precursor solution. According to one embodiment, when the polymer precursor solution comprises a solvent, the monomer A represents a quantity by weight of more than 0% to 10%, preferably of more than 0% to 1%, by weight relative to the total weight of the polymer precursor solution. According to one embodiment, when the polymer precursor solution comprises a solvent, the monomer A represents a quantity by mass approximately equal to 0.10% by weight relative to the total weight of the polymer precursor solution. According to one embodiment, when the polymer precursor solution does not include a solvent, the monomer A represents a quantity by weight of more than 0% to 10%, preferably of more than 0% to 1%, by weight relative to the total weight of the polymer precursor solution. According to one embodiment, when the polymer precursor solution does not include a solvent, the monomer A represents a quantity by mass approximately equal to 0.3% by weight relative to the total weight of the polymer precursor solution.

According to one embodiment, the polymer precursor solution comprises the monomer B in a range of more than 0% to 50%, preferably from 1% to 40%, from 1% to 30%, from 1% to 20%, or from 1% to 10% by weight relative to the total weight of the polymer precursor solution. According to one embodiment, the polymer precursor solution comprises approximately 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49% or 50% of monomer B, the percentages being expressed by weight relative to the total weight of the polymer precursor solution. According to one embodiment, when the polymer precursor solution does not include a solvent, the monomer B represents a quantity by weight of more than 0% to 50%, by weight relative to the total weight of the polymer precursor solution. According to one embodiment, when the polymer precursor solution comprises a solvent, the monomer B represents a quantity by weight of more than 0% to 30%, by weight relative to the total weight of the polymer precursor solution. According to one embodiment, when the polymer precursor solution does not include a solvent, the monomer B represents a quantity by weight approximately equal to 23% or 41% by weight relative to the total weight of the polymer precursor solution. According to one embodiment, when the polymer precursor solution comprises a solvent, the monomer B represents a quantity by weight approximately equal to 10% or 20% by weight relative to the total weight of the polymer precursor solution.

According to one embodiment, the polymer precursor solution comprises the photoinitiator in a range of more than 0% to 30%, preferably from 10% to 25%, from 1% to 20%, from 1% at 15%, from 1% to 10%, or from 1% to 5% by weight relative to the total weight of the polymer precursor solution. According to one embodiment, the polymer precursor solution comprises the photoinitiator in a quantity by mass approximately equal to 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29% or 30% by weight relative to the total weight of the polymer precursor solution. According to one embodiment, when the polymer precursor solution does not include a solvent, the photoinitiator represents a quantity by weight of more than 0% to 30%, preferably from 1% to 20%, by weight relative to the weight total of the polymer precursor solution. According to one embodiment, when the polymer precursor solution does not include a solvent, the photoinitiator represents a quantity by weight approximately equal to 13% or 17% by weight relative to the total weight of the polymer precursor solution.

According to one embodiment, when the polymer precursor solution comprises a solvent, the photoinitiator represents a quantity by weight of more than 0% to 20%, preferably from 1% to 10%, by weight relative to the total weight of the polymer precursor solution. According to one embodiment, when the polymer precursor solution comprises a solvent, the photoinitiator represents a quantity by weight approximately equal to 6% or 7% by weight relative to the total weight of the polymer precursor solution.

According to one embodiment, when the polymer precursor solution comprises both monomer C and monomer D, the mass ratio of monomer C to monomer D varies from more than 0 to 10, preferably from 1 to 6, more preferably said mass ratio is approximately equal to 4 or 5. According to one embodiment, when the polymer precursor solution comprises both the monomer C and the monomer D, the mass ratio of the monomer C to the monomer D is approximately equal to 1, 2, 3, 4, 5, 6, 7, 8, 9 or 10.

According to one embodiment, the polymer precursor solution comprises the monomer C in a range of more than 0% to 60%, preferably from 1% to 50%, from 1% to 40%, from 1% to 30%, from 1% to 20%, or from 1% to 10%, the percentages being expressed by weight relative to the total weight of the polymer precursor solution. According to one embodiment, the polymer precursor solution comprises approximately 1%, 2%, 3%, 4%, 5%, 6%, 7%, 8%, 9%, %, %11%, %12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59% or 60% of monomer C, by weight relative to the total weight of the polymer precursor solution. According to one embodiment, when the polymer precursor solution does not include a solvent, the monomer C represents a quantity by weight of more than 0% to 50%, by weight relative to the total weight of the polymer precursor solution. According to one embodiment, when the polymer precursor solution does not include a solvent, the monomer C represents a quantity by weight approximately equal to 30%, 38%, 40% or 50% by weight relative to the total weight of the precursor solution of polymer. According to one embodiment, when the polymer precursor solution comprises a solvent, the monomer C represents a quantity by weight of more than 0% to 30%, by weight relative to the total weight of the polymer precursor solution. According to one embodiment, when the polymer precursor solution comprises a solvent, the monomer C represents a quantity by weight approximately equal to 15%, 17%, 19% or 21% by weight relative to the total weight of the polymer precursor solution.

According to one embodiment, the polymer precursor solution comprises the monomer D in a range of more than 0% to 20%, preferably from 1% to 15%, from 1% to 10%, or from 1% at 5% by weight relative to the total weight of the polymer precursor solution. According to one embodiment, the polymer precursor solution comprises approximately 1%, 2%, 3%, 4%, 5%, 6%, 7%, 8%, 9%, %, %11%, %12%, 13%, 14%, 15%, 16%, 17%, 18%, 19%, or 20%, of monomer D by weight relative to the total weight of the polymer precursor solution. According to one embodiment, when the polymer precursor solution does not include a solvent, the monomer D represents a quantity by mass of more than 0% to 20%, preferably from 1% to 15%, more preferably from 5% to 12. % by weight relative to the total weight of the polymer precursor solution. According to one embodiment, when the polymer precursor solution does not include a solvent, the monomer D represents a quantity by weight approximately equal to 8% or 10% by weight relative to the total weight of the polymer precursor solution. According to one embodiment, when the polymer precursor solution comprises a solvent, the monomer D represents a quantity by weight of more than 0% to 10%, preferably from 1% to 8%, by weight relative to the total weight of the polymer precursor solution. According to one embodiment, when the polymer precursor solution comprises a solvent, the monomer D represents a quantity by mass approximately equal to 4% by weight relative to the total weight of the polymer precursor solution.

According to one embodiment, the polymer precursor solution consists or comprises:

dimethyl ester protoporphyrin,
polyethylene glycol diacrylate (PEGDA),
a solution of 2-(acryloyloxy)ethyl)trimethylammonium chloride, preferably 80% by weight in water,
copper dimethacrylate,
a polar solvent, preferably dimethylsulfoxide (DMSO), and
diphenyl (2,4,6-trimethylbenzoyl) phosphine oxide.

According to one embodiment, the polymer precursor solution consists or comprises:

disodium salt of protoporphyrin,
polyethylene glycol diacrylate (PEGDA),
a solution of (2-(acryloyloxy)ethyl)trimethylammonium chloride, preferably 80% by weight in water,
copper dimethacrylate,
a polar solvent, preferably dimethylsulfoxide (DMSO), and
diphenyl (2,4,6-trimethylbenzoyl) phosphine oxide.

According to one embodiment, the polymer precursor solution consists or comprises:

disodium salt of protoporphyrin,
polyethylene glycol diacrylate (PEGDA),
(2-(acryloyloxy) ethyl) trimethyl ammonium chloride,
copper acrylate,
a polar solvent, preferably a water/ethanol mixture, and
diphenyl (2,4,6-trimethylbenzoyl) phosphine oxide.

According to one embodiment, the polymer precursor solution consists or comprises:

disodium salt of protoporphyrin,
polyethylene glycol diacrylate (PEGDA),
copper dimethacrylate,
2-(dimethylamino)ethyl acrylate,
a polar solvent, preferably dimethylsulfoxide (DMSO), and
diphenyl (2,4,6-trimethylbenzoyl) phosphine oxide.

According to one embodiment, the polymer precursor solution consists or comprises:

10 mg of protoporphyrin dimethyl ester or protoporphyrin disodium salt,
0.7 g of polyethylene glycol diacrylate (PEGDA),
1.5 g of a solution of (2-(acryloyloxy) ethyl) trimethylammonium chloride, preferably 80% by weight in water,
0.3 g of copper dimethacrylate,
4 g of a polar solvent, preferably dimethyl sulfoxide (DMSO), and
500 mg of diphenyl (2,4,6-trimethylbenzoyl) phosphine oxide.

According to one embodiment, the polymer precursor solution consists or comprises:

10 mg of protoporphyrin dimethyl ester or protoporphyrin disodium salt,
0.7 g of polyethylene glycol diacrylate (PEGDA),
0.9 g of 2-(dimethylamino)ethyl acrylate,
0.3 g of copper dimethacrylate,
4 g of a polar solvent, preferably dimethyl sulfoxide (DMSO), and
500 mg of diphenyl(2,4,6-trimethylbenzoyl)phosphine oxide.

Step (b)

According to one embodiment, the method of the invention comprises a step of bringing the polymer precursor solution obtained in (a) into contact with a support, resulting in the impregnation of said support with said polymer precursor solution. (step noted (b)).

According to one embodiment, step (b) is carried out at a temperature of more than 0° C. to 50° C., preferably 5° C. to 30° C., more preferably at a temperature approximately equal to 20° C.

According to one embodiment, step (b) is carried out at atmospheric pressure.

According to one embodiment, the support can be any support known to those skilled in the art, including natural or synthetic supports. According to one embodiment, the support can be hard or flexible. According to one embodiment, the support is capable of reacting with at least one radical polymerizable function of a monomer as defined above. According to one embodiment, the support comprises or consists of a cellulose compound such as, for example, cotton or paper.

According to one embodiment, the support comprises or consists of at least one synthetic or natural polymer. According to one embodiment, the support is made of polymer or comprises a polymer, preferably chosen from polystyrenes, polyacrylates, polymethacrylates, polyolefins (such as polyethylene, polypropylene, polybutadiene), polyurethanes, polyacrylamides, polyacrylonitriles, polyamides, polyesters, polyethers, polycarbonates, polyimides, polyketones, polysiloxanes, polyepoxides, and their copolymers and/or mixtures thereof.

According to one embodiment, the natural polymer is chosen from cellulose and rubber (i.e. poly(isoprene)).

According to one embodiment, the precursor polymer solution as defined above is applied to the support by any technique known to those skilled in the art including spray (or vaporization), dipping, sizing, inkjet printing such as that "dip coating" or "drop coating" (coating by depositing drop by drop on the surface of the support).

According to one embodiment, step (b) further comprises a drying step. According to one embodiment, step (b) further comprises a washing step. According to one embodiment, step (b) further comprises a step of evaporating the solvent.

According to one embodiment, step (b) is carried out in a dark environment, that is to say in an environment protected from light.

Step (c)

According to one embodiment, the process of the invention further comprises a step of irradiating the support impregnated with the polymer precursor solution, obtained in step (b). According to one embodiment, the irradiation in step (c) is irradiation with ultraviolet (UV) radiation. According to one embodiment, the irradiation, preferably UV, is carried out at an absorption wavelength less than the maximum absorption wavelength $\lambda_{max}$ of monomer A as described above.

According to one embodiment, the irradiation of step (c) is carried out by a UV lamp known to those skilled in the art, preferably by a UV lamp emitting at a wavelength of about 365 nm.

According to one embodiment, the irradiation duration of step (c) is from more than 0 seconds to 24 hours, preferably from is to 12 h, more preferably from is to 3600 s. According to one embodiment, the irradiation duration of step (c) ranges from more than 0 s to 24 hours, preferably from is to 12 h, more preferably from is to 3600 s. According to one embodiment, the duration of irradiation of step (c) is from is to 60 s, preferably from is to 50 s, from is to 40 s, from is to 30 s, from is to 20 s or from is to 10 s.

According to one embodiment, the wavelength of the irradiation of step (c) is from 10 nm to 380 nm, preferably from 120 nm to 370 nm, more preferably from 200 nm to 380 nm. According to one embodiment, the wavelength of the irradiation of step (c) is approximately equal to 365 nm. According to one embodiment, the wavelength of the irradiation of step (c) is from 10 nm to 380 nm, preferably from 120 nm to 370 nm, more preferably from 200 nm to 370 nm.

According to one embodiment, the absorption wavelength is less than the maximum absorption wavelength $\lambda_{max}$ of the monomer A as defined above, preferably is less than 400 nm, more preferably is less at 390 nm, 380 nm, or 370 nm.

Step (d)

According to one embodiment, the process of the invention further comprises a step of activating the monomer A. According to one embodiment, the activation of the monomer A is carried out by irradiating the monomer A, preferably the monomer A having been incorporated into the polymer impregnating the modified support after the implementation of steps (a) to (c) of the process of the invention.

According to one embodiment, the activation of the monomer A is carried out by light irradiation, preferably at a wavelength included in the visible range, more preferably at the maximum absorption wavelength $\lambda_{max}$ porphyrin, more preferably at about 400 nm.

According to one embodiment, the activation of the monomer A is carried out for a period of 30 s to 24 hours, preferably 1 mn to 12 h, preferably 2 mn to 6 h. According to one embodiment, the activation of monomer A is carried out for a period of approximately 1 h, 2 h, 3 h, 4 h, 5 h, 6 h, 7 h, 8 h, 9 h, 10 h, 11 h, 12 h, 13 h, 14 h, 15 h., 16 h, 17 h, 18 h, 19 h, 20 h, 21 h, 22 h, 23 h or 24 h. According to one embodiment, the activation of monomer A is carried out for a period of approximately 1 mn, 2 mn, 3 mn, 4 mn, 5 mn, 6 mn, 7 mn, 8 mn, 9 mn, 10 mn, 11 mn, 12 mn, 13 mn, 14 mn, 15 mn, 16 mn, 17 mn, 18 mn, 19 mn, 20 mn, 21 mn, 22 mn, 23 mn, 24 mn, 25 mn, 26 mn, 27 mn, 28 mn, 29 mn, 30 mn, 31 mn, 32 mn, 33 mn, 34 mn, 35 mn, 36 mn, 37 mn, 38 mn, 39 mn, 37 mn, 38 mn, 39 mn 40 mn, 41 mn, 42 mn, 43 mn, 44 mn, 45 mn, 46 mn, 47 mn, 48 mn, 49 mn, 50 mn, 51 mn, 52 mn, 53 mn, 54 mn, 55 mn, 56 mn, 57 mn, 58 mn, 59 mn or 60 min. According to one embodiment, the activation of monomer A is carried out for a period of is to 60 s, preferably 20 s to 40 s, more preferably of about 30 s.

Precursor Solution

The present invention also relates to a precursor solution of a biocidal, bactericidal and/or bacteriostatic polymer, said solution being defined as described above.

Material

The present invention also relates to a biocidal, bactericidal and/or bacteriostatic material. According to one embodiment, the material of the invention is capable of being obtained by the process of the invention, as described above.

According to one embodiment, the material of the invention comprises or consists of a support and a polymer coating, preferably said polymer coating having been obtained from a precursor polymer solution as described above.

According to one embodiment, the support can be any support known to those skilled in the art, including natural or synthetic supports. According to one embodiment, the support can be hard or flexible. According to one embodiment, the support is capable of reacting with at least one radical polymerizable function of a monomer as defined above. According to one embodiment, the support comprises or consists of a cellulose compound such as, for example, cotton or paper.

According to one embodiment, the support is made of polymer or comprises a polymer, preferably chosen from polystyrenes, polyacrylates, polymethacrylates, polyolefins (such as polyethylene, polypropylene, polybutadiene), polyurethanes, polyacrylamides, polyacrylonitriles, polyamides, polyesters, polyethers, polycarbonates, polyimides, polyketones, polysiloxanes, polyepoxides, and their copolymers and/or mixtures thereof.

According to one embodiment, the coating is organic, preferably comprises or consists of an organic polymer, more preferably of a polymer obtained by radical polymerization, more preferably by radical polymerization from the precursor polymer solution. as described above.

According to one embodiment, the coating comprises or consists of one or more macromolecular chains, preferably organic macromolecular chains, more preferably organic macromolecular chains comprising one or more quaternary ammonium functions and/or more copper ions of oxidation degree+II.

According to one embodiment, the material or the coating of the invention has a biocidal, bactericidal and/or bacteriostatic activity against bacteria of the Gram positive type (Gram +) and/or Gram negative type (Gram −), preferably against *Escherichia coli* (Gram −), *Bacillus thuringiensis* (Gram +) in vegetative form (bacterial form), *Yersinia pestis* (Gram −) and/or *Bacillus anthracis* (Gram +) vegetative, as well as sporulated form of *B. thuringiensis*. Indeed, certain bacterial species such as *B. thuringiensis* are capable of sporulating. In the present invention, the term "bacterial spores" is understood to mean a multilayer microbial form extremely resistant to environmental disturbances (nutritional stress, desiccation, heat, radiation, antibiotics, standard antiseptics and disinfectants, etc.). This resistance is notably linked to their unique structure which is particularly compact and not very permeable.

Uses

The invention also relates to the use of the precursor polymer solution, of the material or of the process of the invention, as described above.

According to one embodiment, the precursor polymer solution, the material or the process of the invention are useful in the field of textiles or protective coatings, or in the sanitary field.

According to one embodiment, the precursor polymer solution, the material or the process of the invention are useful for the preparation of protective clothing or protective coatings.

According to one embodiment, the precursor polymer solution of the invention or the biocidal, bactericidal and/or bacteriostatic material of the invention is useful for the sterilization and/or decontamination of a surface.

Kit

The invention also relates to a kit for implementing the method of the invention.

According to one embodiment, the kit comprises at least one compartment comprising the polymer precursor solution as described above.

According to one embodiment, the kit comprises:

- a first compartment in which are mixed the monomer A, the monomer B, and at least one of the monomers C and D; and
- a second compartment comprising the photoinitiator.

According to one embodiment, the kit comprises:

- a first compartment in which the monomer A, the monomer B, and at least one of the monomers C and/or D are mixed; and
- a second compartment comprising the photoinitiator.

According to one embodiment, the kit is opaque and does not allow light to pass.

EXAMPLES

The present invention will be better understood on reading the following examples which non-limitatively illustrate the invention.

Abbreviations cm: centimeter(s)
DMSO: dimethylsulfoxide
g: gram
kW: kilowatt(s)
mg: milligramme(s)
min: minute(s)
nm: nanometer(s)
Mw: molecular molar mass by weight (expressed in g/mol)
PBS: phosphate buffered saline
PEGDA: polyethylene glycol diacrylate
PTFE: polytetrafluroroethylene
s: second(s)
UV: ultraviolets
W/cm$^2$: watt per square centimeter Material and Methods Part 1—Chemistry

Example 1: Preparation of Polymer Precursor Solutions

Within the scope of the invention, various inks have been prepared:

- an ink containing neither ammonium nor copper (ink A),
- three inks comprising a protoporphyrin, an ammonium and a compound comprising copper (inks B, C and F), and
- two porphyrin-free inks: ink D comprising copper but no ammonium and ink E comprising ammonium but no copper.

These inks were prepared by mixing the compounds listed below for each ink. Then, after stirring by ultrasound, all the inks were filtered through a PTFE filter (0.45 μm) and stored in the dark.

TABLE 1

| | |
|---|---|
| Ink A | Protoporphyrin IX disodium salt (CAS N °: 50865-01-5): 10 mg<br>Polyethylene glycol diacrylate with $M_w$ of about 750 g/mol (CAS N°: 26570-48-9): 0.7 g<br>2-(Dimethylamino) ethyl acrylate (CAS N°: 2439-35-2): 0.90 g<br>Methyl Methacrylate (CAS N°: 80-62-6): 0.25 g<br>DMSO (CAS N°: 67-68-5): 4 g<br>Diphenyl (2,4,6-trimethylbenzoyl)phosphine oxide (CAS N°: 75980-60-8): 500 mg |
| Ink B | Dimethyl ester protoporphyrin IX (CAS N°: 5522-66-7): 10 mg<br>Polyethylene glycol diacrylate with $M_w$ of about 750 g/mol (CAS N°: 26570-48-9): 0.7 g<br>(2-(acryloyloxy)ethyl)trimethylammonium chloride solution (80% wt. in water) (CAS N°: 44992-01-0): 1.5 g<br>Copper dimethacrylate ($Cu^{2+}$) (CAS N°: 19662-59-0): 0.3 g<br>DMSO (CAS N°: 67-68-5): 4 g<br>Diphenyl(2,4,6-trimethylbenzoyl)phosphine oxide (CAS N°: 75980-60-8): 500 mg |
| Ink C | Protoporphyrin IX disodium salt (CAS N°: 50865-01-5): 10 mg<br>Polyethylene glycol diacrylate with $M_w$ of about 750 g/mol (CAS N°: 26570-48-9): 0.7 g<br>(2-(acryloyloxy)ethyl)trimethylammonium chloride solution (80% wt. in water) (CAS N°: 44992-01-0): 1.5 g<br>Copper dimethacrylate (Cu2+) (CAS N°: 19662-59-0): 0.3 g<br>DMSO (CAS N°: 67-68-5): 4 g<br>Diphenyl(2,4,6-trimethylbenzoyl)phosphine oxide (CAS N°: 75980-60-8): 500 mg |

TABLE 1-continued

| | |
|---|---|
| Ink D | Polyethylene glycol diacrylate with $M_w$ of about 750 g/mol (CAS N°: 26570-48-9): 0.7 g<br>2-(Dimethylamino)ethyl acrylate (CAS N°: 2439-35-2): 0.90 g<br>Copper dimethacrylate ($Cu^{2+}$) (CAS N°: 19662-59-0): 0.3 g<br>DMSO (CAS N°: 67-68-5): 4 g<br>Diphenyl(2,4,6-trimethylbenzoyl)phosphine oxide (CAS N°: 75980-60-8): 500 mg |
| Ink E | Polyethylene glycol diacrylate with $M_w$ of about 750 g/mol (CAS N°: 26570-48-9): 0.7 g<br>(2-(acryloyloxy)ethyl)trimethylammonium chloride solution (80% wt. in water) (CAS N°: 44992-01-0): 1.5 g<br>Methyl methacrylate (CAS N°: 80-62-6): 0.25 g<br>DMSO (CAS N°: 67-68-5): 4 g<br>Diphenyl(2,4,6-trimethylbenzoyl)phosphine oxide (CAS N°: 75980-60-8): 500 mg |
| Ink F | Protoporphyrin IX disodium salt (CAS N°: 50865-01-5): 10 mg<br>Polyethylene glycol diacrylate with $M_w$ of about 750 g/mol (CAS N°: 26570-48-9): 0.7 g<br>(2-(acryloyloxy) ethyl) trimethyl ammonium chloride solution (80% by weight in water) (CAS N°: 44992-01-0): 1.5 g<br>Copper acrylate ($Cu^{2+}$) (CAS N°: 20074-76-4): 0.13 g<br>Ethanol (CAS N°: 67-68-5): 2 g<br>Water: 2 g<br>Diphenyl (2,4,6-trimethylbenzoyl) phosphine oxide (CAS N°: 75980-60-8): 250 mg |

Example 2: Process for Preparing a Biocidal, Bactericidal and/or Bacteriostatic Material The process for preparing a biocidal, bactericidal and/or bacteriostatic material was implemented in:

preparing one of the precursor polymer solutions (or ink) as described in Example 1, then by bringing this ink into contact with a support (1.2 cm diameter cotton disc). In the experiments carried out by the Applicant, the support was impregnated with ink by any one of the following techniques: spray, dipping, sizing, inkjet printing, "dip coating" or "drop coating" (coating by drip deposit on the surface of the support).

The supports impregnated with the ink were then irradiated under UV at a wavelength of approximately 365 nm (UVKURE 120 LED lamp—365 nm, 1.5 kW, 12 W/cm$^2$, Kelenn Technology, France). Both sides of the support can be irradiated. The irradiation time of each side of the support is from 2 s to 1 min.

Part 2—Microbiological Tests

The aim of these experiments is to show the biocidal, bactericidal and/or bacteriostatic properties of the materials obtained by the process of the invention.

For this, the materials grafted with inks (obtained according to experiment 2) are, before grafting, washed with water, then washed with ethanol and then autoclaved (130° C. for 20 min) before to perform microbiology tests. In order to verify that the autoclaving treatment does not alter the biocidal properties of the inks, microbiological tests were also carried out on materials autoclaved after grafting.

2.1: Protocols for Performing Microbiology Tests 2.1.1. Bacterial Strains

The microbiological tests were carried out using the following bacterial strains:

A—Bacterial strains used in BSL1/BSL2 Laboratory (BSL: BioSafety Laboratory):
  *Escherichia coli* BL21 star (Gram −)
  *Bacillus thuringiensis* vegetative and sporulated form (Gram +)

B—Bacterial strains used in the laboratory BSL3
  *Yersinia pestis* (Gram −)
  *Bacillus anthracis* vegetative form (Gram +)

2.1.2. Protocol Applied to Vegetative Cells

The protocol applied to the vegetative cells consists of the implementation of the following steps:

Preculture

Take a few bacterial colonies (the bacteria have been isolated beforehand on plates of LB (Luria-Bertani medium) agar). Incubate overnight at 37° C. with shaking in appropriate liquid culture medium (LB).

Initial Culture

The goal is to obtain an initial culture which corresponds to a bacterial culture in exponential phase at 106 CFU (Colony Forming Unit)/mL which is used for the contamination of the materials to be tested.

For this, dilute the preculture to 200th in the appropriate culture medium (LB).

Incubate at 37° C. with stirring (approximately 2 to 3 hours for *E. coli* and *Bacillus* spp., 6 hours for *Y. pestis*)

Measure the OD at 600 nm until an optical density (OD) of about 0.4 (exponential phase) is obtained.

Dilute in the appropriate culture medium (LB) to obtain $10^6$ CFU/mL.

Example: OD=0.4 with *E. coli*. For *E. coli* OD=1 corresponds to $5.10^8$ CFU/mL. So DO=0.4 corresponds to $0.4*5.10^8=2.10^8$ CFU/mL. To obtain 10 mL of a solution with a concentration of $10^7$ CFU/mL: $V=(10*10^7)/(2.10^8)=0.500$ mL or 500 µL. Add 500 µL of the preculture to 9.5 mL of medium (LB)->$10^7$ CFU/mL. Dilute 1/10th to obtain $10^6$ CFU/mL. Similar DO/CFU correspondence for vegetative *E. coli, Y. pestis, Bacillus.*

Contamination

Inoculate the discs (cotton tissue) with 30 µL of the initial culture at $10^6$ CFU/mL. Place the Petri dishes containing the discs and the culture medium in the incubator with the standard 4000K LED lighting system (Lexman Light 230 V, E14, 470 Lumen). Incubate at 30° C. for 24 hours (AATCC 100-2004 standard) or less (1 hour, 30 min, 5 min), in order to determine the minimum efficiency time, in a humid atmosphere.

For short exposure times, not allowing exposure of the disks to the LED lighting system, another test protocol consists of subjecting the Petri dishes containing the disks to natural light for 30 seconds in a room where the temperature is regulated at 22° C.

Controls

For each bacteriological test, 4 conditions (tested in duplicate) including 3 controls were tested:

(1) Untreated disc and protected from light (2) Untreated disc exposed to light (3) Treated disc and protected from light (4) Treated disc exposed to light To do this, the discs are placed in sterile Petri dishes with a handkerchief soaked in water (humid atmosphere). One of the boxes is exposed to the light, the other is put in the dark (covered with aluminum foil). The exposure to light is carried out, for the exposure time of 30 seconds, by subjecting the Petri dishes containing the discs to natural light for 30 seconds in a room where the temperature is regulated; for exposure times of 24 h, 1 h, 30 min or 5 min by incubation at 30° C. in an incubator with the lighting system with standard 4000K LED (Lexman Light 230 V, E14, 470 Lumen).

Extraction of Bacteria from Samples

Place each disc in an Eppendorf tube containing 1 mL of PBS buffer (Phosphate Buffered Saline).

Recover the surplus of the volume of inoculum that remained on the Petri dishes and insert it into the Eppendorf tube containing the disc and the PBS buffer. Incubate for 30 minutes, at room temperature, with stirring at 200 rpm (revolutions per minute) and protected from light.

Enumeration

Carry out decimal dilutions for each sample in PBS buffer. Place 100 μL of each dilution in a dish of LB agar medium. Spread and incubate at 37° C. overnight. Count the colonies and deduce the bacterial concentration.

2.1.3. Protocol Applied to Spore-Forming Bacteria

The spore solutions are produced and stored in distilled water. Their stability is evaluated every month by counting by limit dilutions. The spore concentration used in these tests is $10^5$ CFU/mL.

The discs are placed in sterile Petri dishes with a handkerchief soaked in water (humid atmosphere). The volume of inoculum for contamination is 30 μL. One of the boxes is exposed to the light, the other is in the dark (covered with aluminum foil). The exposure of the spores to the grafted discs is 24 hours.

The extraction of the spores from the samples is carried out according to a protocol similar to that applied to vegetative cells, except the use of distilled water instead of PBS and the addition of a 30 second sonication step. before the 30-minute incubation with shaking.

The enumeration protocol is identical to that for vegetative cells, except for the use of distilled water instead of PBS.

2.2: Microbiology Test Results

The microbiological results obtained from the materials of the invention are presented in the tables below.

2.2.1. Comparison of the Bactericidal Action of Porphyrin Having an Arylazide Function Described in BERTHELOT et al. (WO2018/069508) and the Action of Protoporphyrin IX.

In order to compare the bactericidal properties of the arylazide porphyrin described in the aforementioned patent and a protoporphyrin IX (single component of ink A which comprises a protoporphyrin but neither ammonium nor copper), cotton discs grafted with these two types porphyrins were tested (Table 2) on Gram + (*B. thuringiensis*) and Gram− (*E. coli*) bacteria. Protoporphyrin IX exhibits greater bactericidal activity than porphyrin arylazide on Gram + and Gram− bacteria.

TABLE 2

| Bacterium | Ink type | Exposure time | Bactericidal effect In the light | In the dark |
|---|---|---|---|---|
| Gram+ (*B. thuringiensis*) | Porphyrin arylazide | 30 min | Total | No effect |
| | | 5 min | 3 log decrease | No effect |
| | Protoporphyrin IX (ink A) | 30 min | Total | Total |
| | | 5 min | Total | 1.5 log decrease |
| Gram− (*E. Coli*) | Porphyrin arylazide | 1 h | 2 log decrease | No effect |
| | | 30 min | No effect | No effect |
| | Protoporphyrin IX (ink A) | 1 h | Total | 1 log decrease |
| | | 30 min | Total | 0.3 log decrease |

Table 2: Results of Bacterial Tests Carried Out from Materials Grafted with Porphyrin Arylazide or Protoporphyrin IX (Ink A)

2.2.2. Tests on Bacterial Strains of Inks Containing Protoporphyrin IX Copper and Quaternary Ammonium: Inks B and C For the tests relating to the bacterial strains (Cf. Tables 3 and 4 below), the results indicate that the inks B and C have a total bactericidal activity from 30 seconds of contact, whether in light. or in the dark on Gram + (*B. thuringiensis*) and Gram− (*E. coli*) bacteria. BSL3 laboratory tests demonstrate the bactericidal activity of C ink on agents *B. anthracis* and *Y. pestis* within 5 min. In addition, this activity is not altered after an autoclaving cycle (130° C. for 20 min) of the treated discs.

TABLE 3

| Ink type | Bacteria | Bactericidal effect In the light | In the dark |
|---|---|---|---|
| Ink B | Gram− (*E. Coli*) | Total at 1 H, 5 min and 30 s | Total at 1 H, 5 min and 30 s |
| | Gram+ (*B. Thuringiensis* vegetatives) | Total at 5 min and 30 s | Total at 5 min and 30 s |
| Ink C | Gram− (*E. Coli*) | Total at 1 H, 5 min and 30 s | Total at 1 H, 5 min and 30 s |
| | Gram+ (*B. Thuringiensis* vegetatives) | Total at 5 min and 30 s | Total at 5 min and 30 s |
| | Gram− (*Y. Pestis*) | Total at 5 min | Total at 6 min |
| | Gram+ (*B. Anthracis*) | Total at 5 min | Total at 5 min |

Table 3: Results of Bacterial Tests Carried Out Using Materials Obtained with Non-Autoclaved B and C Inks.

TABLE 4

| Ink type | Bacteria | Bactericidal effect at 1 h In the light | Bactericidal effect at 1 h In the dark |
|---|---|---|---|
| INK B autoclaved after grafting | Gram− (*E. Coli*) | Total | Total |
| | Gram+ (*B. Thuringiensis* vegetatives) | Total | Total |
| Ink C autoclaved after grafting | Gram− (*E. Coli*) | Total | Total |
| | Gram+ (*B. Thuringiensis* vegetatives) | Total | Total |

Table 4: Results of Bacterial Tests Carried Out Using Materials Obtained with B and C Inks Autoclaved after Grafting.

2.2.3. Test Results on Spores Containing Protoporphyrin IX Copper and Quaternary Ammonium: Inks B and C For the tests on bacterial spores (see Table 5 below), the results indicate that only ink C has sporicidal activity in the light. The difference between the two inks comes from the nature of the protoporphyrin: the disodium salt of protoporphyrin IX has a biocidal action on the spores while the porphyrin dimethyl ester does not.

TABLE 5

| Ink type | Bacteria | Bactericidal effect after 24 h of exposure to light |
|---|---|---|
| Ink B | Spores of *B. Thuringiensis* | No effect |
| Ink C | | 1 log decrease |

Table 5: Tests on the Sporicidal Activity of Materials Obtained with Inks B and C.

2.2.3. C-Ink Deconvolution Tests on Bacteria.

In order to define the bactericidal action of the various active ingredients of the ink having the greatest bactericidal and sporicidal capacity, the ink C was broken down and each component was grafted separately.

For this, the model bacterium chosen for this test was a Gram + bacterium, *B. thuringiensis.*

Tests with ink A, containing only the disodium salt of protoporphyrin IX, and presented in Table 6, demonstrated that ink A does not exhibit optimal bactericidal activity in the dark. Copper alone (Ink D) or quaternary ammonium alone (Ink E) exhibit complete bactericidal activity in light and darkness. Adding these 2 components to protoporphyrin IX (Ink C) restores full bactericidal activity in the dark.

TABLE 6

| Ink type | Bacteria | Bactericidal effect after 5 min of exposure In the light | Bactericidal effect after 5 min of exposure In the dark |
|---|---|---|---|
| Ink A (protoporphyrin alone) | Gram+ (*B. Thuringiensis*) | Total | 1.5 log decrease |
| Ink D (copper alone) | | Total | Total |
| Ink E (quaternary ammonium alone) | | Total | Total |
| Ink C (protoporphyrin + copper + quaternary ammonium) | | Total | Total |

Table 6 Bactericidal Effect in Light and in the Dark of Materials Impregnated with One of the Inks A, C, D or E.

2.2.4. C Ink Deconvolution Tests on Spores

The deconvolution tests of Ink C on the spores of *B. thuringiensis* (Table 7), made it possible to demonstrate that only inks having the disodium salt of protoporphyrin IX exhibit a sporicidal action. D (copper only) and E (quaternary ammonium only) inks have no sporicidal action.

TABLE 7

| Ink type | Bacteria | Bactericidal effect after 24 h of exposure to light |
|---|---|---|
| Ink C | Spores of *B. Thuringiensis* | 1 log decrease |
| Ink A | | 1 log decrease |
| Ink D | | No effect |
| Ink E | | No effect |

Table 7: Sporicidal Effect in Light and in the Dark of Materials Impregnated with One of the Inks A, C, D or E.

2.2.5. Optimization of Raw Materials Used

In order to optimize the raw materials used, other carrier solvents and varying amounts of certain compounds were tested (Table 8).

TABLE 8

| Ink type | Bacteria | Bactericidal effect after 5 min of exposure In the light | Bactericidal effect after 5 min of exposure In the dark |
|---|---|---|---|
| Ink F | Gram− (*E. Coli*) | Total | Total |
| | Gram+ (*B. Thuringiensis*) | Total | Total |

Table 8: Bactericidal Effect in Light and Dark of Materials Impregnated with F Ink.

The change of solvent (water/ethanol instead of DMSO) and amounts of initiator and copper did not affect the quality of the material deposited on the cottons. The bactericidal properties at 5 min of exposure, in light as in darkness, on Gram + and Gram− bacteria are preserved.

The invention claimed is:

1. A biocidal, bactericidal and/or bacteriostatic material comprising a support impregnated with a biocidal, bactericidal and/or bacteriostatic polymer matrix resulting from the radical polymerization of a precursor polymer solution, the precursor solution comprising the mixture of: (a) at least one monomer A having a porphyrin group and at least one radical polymerizable function, (b) at least one radical polymerizable monomer B, (c) a photoinitiator, (d) at least one of the monomers chosen from: a monomer C comprising a quaternary amine and a radical polymerizable function; and/or (ii) a monomer D comprising copper and a radical polymerizable function, (e) optionally, a solvent.

* * * * *